LOG YARDING SYSTEM
Original Filed Feb. 23, 1967 2 Sheets-Sheet 1
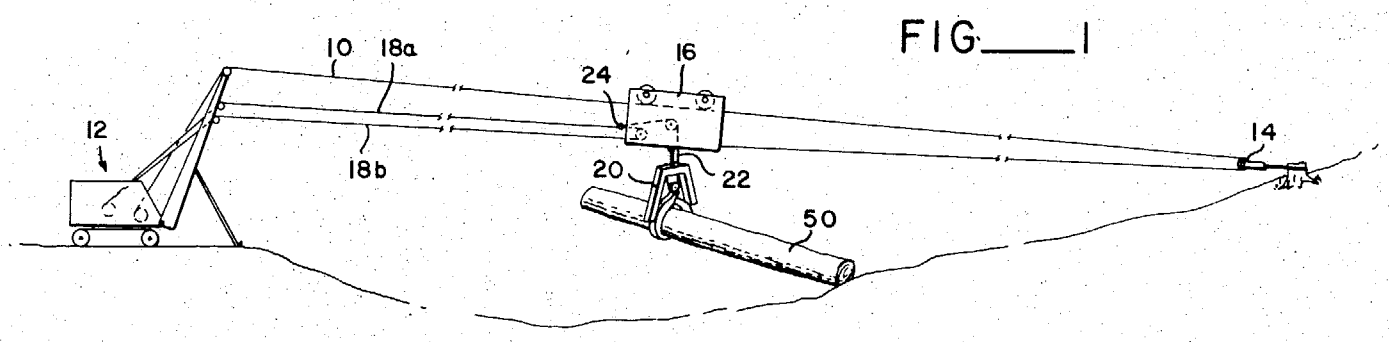
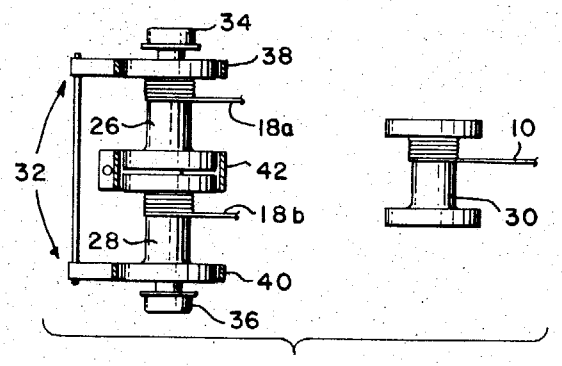
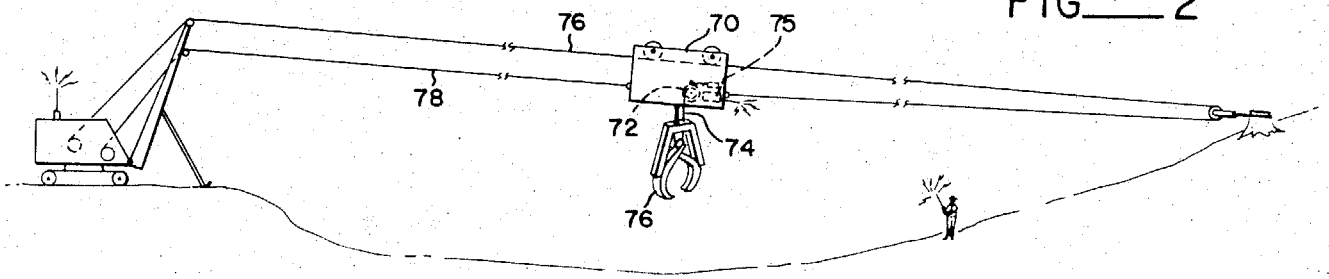
INVENTORS
MAURICE J. MC INTYRE
DAVID G. RENNIE
BY Seed, Berry & Lowry
ATTORNEYS

LOG YARDING SYSTEM

Original Filed Feb. 23, 1967 2 Sheets-Sheet 2

INVENTORS
MAURICE J. MC INTYRE
DAVID G. RENNIE
BY Seed, Berry & Barry
ATTORNEYS

United States Patent Office

Re. 27,621
Reissued Apr. 17, 1973

27,621
LOG YARDING SYSTEM

Maurice J. McIntyre, Coquitlam, British Columbia, and David G. Rennie, Burnaby, British Columbia, Canada, assignors to Skagit Corporation, Sedro Woolley, Wash.

Original No. 3,407,942, dated Oct. 29, 1968, Ser. No. 618,022, Feb. 23, 1967. Application for reissue July 18, 1969, Ser. No. 853,558
Int. Cl. B66c *19/00*
U.S. Cl. 212—84 20 Claims

Matter enclosed in heavy brackets [ ] appears in the original patent but forms no part of this reissue specification; matter printed in italics indicates the additions made by reissue.

ABSTRACT OF THE DISCLOSURE

A system of yarding logs wherein a log grapple is rigged to inhaul and outhaul lines extending between a yarding tower and the outlying outhaul tail block. The grapple can be suspended from a carriage and the carriage carried by the outhaul line or by a separate skyline. The grapple can be a two line, tag line-operated grapple or a single line grapple. In addition, a log yarding system may be provided with a carriage riding on a suspending line and rigged with a two-part inhaul line with a tag line connected to one part of the two-part inhaul line and extended through the carriage to a log engaging means.

Tower yarding systems heretofore have comprised cable rigging assemblies employing cables that are wrapped around a turn of logs and set in chokers by choker setters operating among the felled and trimmed trees. These cable rigging assemblies are rigged to a mainline, or inhaul line, cable extending through a fairlead assembly mounted atop the yarding tower or spar to a mainline cable widing drum designed to wind the mainline thereon to bring a turn of logs into the landing at the base of the tower. Such cable rigging assemblies are also rigged to a haulback line or outhaul line cable extending outwardly through outlying side and tail blocks attached to conveniently located stumps and back through a lead block mounted on the tower to a haulback cable winding drum designed to wind the haulback line thereon to bring the rigging assembly back out from the tower to pick up another turn of logs. A cable rigging assembly may be fixedly connected directly to the inhaul and outhaul lines or rigged to a suspension carriage which in turn would be fixedly connected to the inhaul and outhaul lines and designed to traverse a suspension line suspended between the tower and a tail spar.

A major problem inherent in such tower yarding systems in that choker setters must be employed. Thus terrain that is either inaccessible for one reason or another to choker setters or not easily accessible cannot be yarded at all or only with considerable difficulty and expense.

A primary object of this invention is to provide a tower yarding system that employs a grapple rigged between the inhaul and outhaul lines that can be operated without choker setters. A further object is to provide such a system wherein a grapple is suspended by a suspension carriage and wherein the carriage is suspended by and traverses the outhaul line. Another object is to provide such a system wherein a two-part mainline is rigged to the carriage and employed to operate the grapple. A still further object is to provide such a system wherein a mobile guylineless tower yarder is employed to facilitate maximum application of grapple yarding. These and other objects and advantages will become apparent from the following description and the accompanying drawings.

DESCRIPTION OF DRAWINGS

FIG. 1 is a pictorial representation of one embodiment of the grapple yarding system of this invention wherein a mobile guylineless tower yarder, a two-part inhaul line, a carriage-mounting outhaul line and a two-line, tag line-operated grapple are employed;

FIG. 2 is an other modification of the FIG. 1 illustration showing the application of a radio-controlled grapple to the system of this invention;

FIG. 3 is a plan view of an exemplary yarder drum arrangement for use with the FIG. 1 system;

DESCRIPTION OF INVENTION

Figure 4:
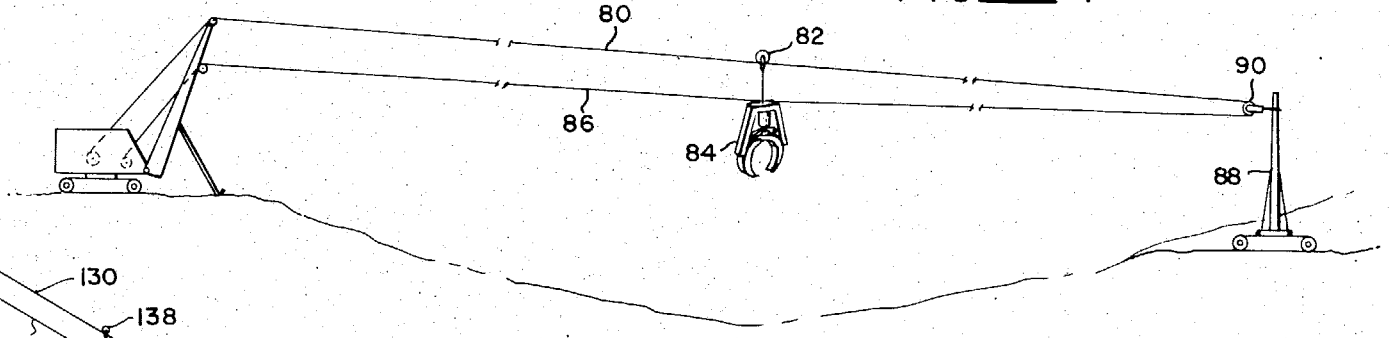
FIG. 4 is a modification of the FIG. 1 illustration showing the application of a single line grapple to the system of this invention.

The yarding system of this invention comprises a grapple rigged between in haul and outhaul lines which extend from cable winding drums mounted on a yarder. The inhaul line extends from its cable winding drum through a fairlead assembly mounted atop a tower to the grapple for hauling the grapple to the landing with a turn of logs. The outhaul line extends from its cable winding drum through a lead block on the tower and through an outlying [tailback] *tailblock* and back to the grapple for hauling the grapple out from the landing to pick up a turn of logs. The grapple may be a single line grapple or any of the conventional two-line grapples and may be of two-point, three-point, four-point, etc. construction. The tower may be mobile or fixed, haulback corner blocks may or may not be employed, and the main and haulback line suspension may be of the skidding or skylining type. For uphill yarding, no outhaul line need be employed.

A preferred embodiment of the system for use with a two-line grapple includes a suspension carriage to which the grapple is rigged and to which the main and haulback lines are rigged. Provision of the carriage permits a grapple-operating tag line to be either housed within the carriage or operatively interrelated to it. It is further preferred that the grapple be fixedly attached to the carriage and the carriage carried by the haulback line such that the grapple is lowered and raised by slackening and tightening the haulback line, thereby eliminating any requirement for a separate carriage-carrying skyline.

With reference to the system disclosed in FIG. 1 a haulback line 10 is shown extending from a haulback cable winding drum mobile, a guylineless tower yarder 12 and a fairleader atop the tower, through a stump-mounted tail block 14, to the tail end of a suspension carriage 16. The carriage sheaves ride on the part of the haulback line that extends between the fairleader and the tailblock. A two-part mainline consisting of parts 18a and 18b, extends from one mainline cable winding drum and a tower-mounted sheave, around a sheave positioned at the head end of the carriage 16, and back through another tower-mounted sheave to another mainline cable winding drum. A two-line, power-open grapple 20 is fixedly suspended from the underside of the carriage and a tag line 22 extends from the grapple, as the grapple operating or control line, around a sheave mounted on the carriage and is connected to one part of the two part main line at 24.

An exemplary cable winding arrangement for use in the FIG. 1 system is shown in FIG. 3. This comprises two parallel in-line mainline cable winding drums 26 and 28 with mainline parts 18a and 18b wound thereon, respectively, and a haulback line cable winding drum 30. The two mainline drums are driven by a common gear mechanism 32 when engaged thereto by air-operated cone-type friction clutches 34 and 36, respectively. Each drum has an independently operable braking means illustrated as a brake band, 38 or 40, that can be applied to the outer rim of the respective drum. The two drums are also provided with a frictional interlock illustrated as an adjustable brake band 42 that is applied to the adjacent inner rims of the two drums.

The system of FIGS. 1 and 3 can be operated in the following manner. With the system in the position shown, with a turn of logs 50 grasped by the grapple and all lines taut, the clutch for mainline drum 28 is engaged to drive drum 28 for winding mainline part 18b thereon. The tag line connector 24 abuts the carriage and therefore winding-in part 18b draws the carriage-grapple-turn of logs assembly toward the landing 52 at the base of the tower. As drum 28 is rotated, the drum 26 also rotates to wind mainline part 18a thereon because of the frictional interlock 42 between the two drums. This frictional interlock is not sufficient to effect a large enough pull on mainline part 18a to cause it to take over as the inhaul or pulling line, but rather drum 26 will slip thereunder if part 18a tends to wind onto drum 26 faster than the winding of part 18b on drum 28. As mainline part 18a pulls the carriage toward the landing, the haulback drum 30 friction is slipped in a conventional manner to permit the carriage to move toward the landing with little or no sag in the haulback line. When the turn of logs has reached the landing, mainline winding-in is terminated and the haulback line is slipped to permit the carriage-grapple-turn of logs assembly to sag to the landing.

The clutch for mainline drum 26 is then engaged to wind mainline part 18a thereon and brake 40 on drum 28 is applied to overcome the frictional interlock 42. As part 18a is drawn in, brake 40 is slipped to permit part 18b to unwind thereby advancing tag line connector 24 toward the tower and away from the carriage to effect the opening of the grapple. After the grapple is opened and the turn of logs has dropped free, the mainline parts 18a and 18b are slipped and the haulback line *is* wound on the haulback drum to draw the carriage outward under tight line conditions. The haulback line is then slipped to drop the carriage-grapple assembly onto another turn of logs. As the main and haulback lines are then tightened, the grapple automatically closes itself about the turn of logs and is raised to the position shown in FIG. 1. The mainline is tightened by pulling on part 18b and slipping part 18a so that tag line connector 24 advances toward the carriage to slacken the tag line from a grapple-open tautness.

If a power-closed grapple is employed wherein pulling the tag line closes the grapple, then the FIGS. 1 and 3 system would be modified. Such modification would provide mainline part 18a as the pulling line and part 18b as the grapple release line. Thus through the frictional drum interlock winding in part 18a would wind in part 18b to bring a turn of logs to the landing. And part 18a would be slipped and part 18b pulled to slacken the tag line to permit the grapple to automatically open.

The mobile, guylineless tower yarder 12 is the subject of our copending U.S. application Ser. No. 525,647, the pertinent portions of which are hereby incorporated herein by this reference. This yarder has a high degree of mobility *and* therefore is especially suitable for use in grapple yarding as taught herein. This mobility is achieved by mounting the cable winding drums and related superstructure on a turntable, itself supported by an endless track vehicle, pivotally mounting a tower member on the superstructure, and pivotally mounting a brace member on the tower member to depend therefrom to the ground to brace the tower member against yarding load forces. No tower guylines are required and therefore the yarder position can be shifted such that a large area can be easily covered with one tail block setting.

The importance of this maneuverability to the success and efficiency of grapple yarding cannot be overemphasized. The weight of the grapple is such that it cannot be maneuvered by hand and therefore the ability to completely yard an area is based on shifting either yarding or tailblock positions or both so that the yarding roads, or lines therebetween will intersect all fallen logs. Thus, the grapple can be carried out to various distances from the tower and dropped to pick up the logs which are intersected by the yarding road.

FIG. 2 also illustrates a grapple yarding system wherein a two-line grapple and a haulback line supported suspension carriage are used and operated in much the same manner as the FIG. 1 system. The carriage 70 is adapted to have a cable winding drum 72 mounted therein around which is wound a grapple-operating tag line 74. The haulback line 76 is rigged as in FIG. 1 but the mainline 78 is a one part line extending to and deadening at the lead end of the carriage. The drum 72 is radio controlled by a receiver-transducer mechanism 75 of any conventional type known to the art. The grapple 76 is fixedly suspended from the carriage and may be of the power opening or power closing type. This system is simpler to operate than the FIG. 1 system but requires more costly equipment—namely the radio controlled drum or winch 72 and the receiver-transducer mechanism 75.

FIG. 4 illustrates a grapple yarding system for use with a single line grapple. A single line grapple is designed to remain open until jarred closed and then to remain closed until jarred open, the single line being employed to suspend the grapple. In this embodiment, the haulback line 80 is rigged as in the previous two embodiments, with a block type carriage 82 supported thereon and fixedly suspending the grapple 84, and the mainline 86 is rigged as in the FIG. 2 embodiment. This system is operated in a manner similar to the FIGS. 1–3 systems except that the grapple opens automatically when dropped on the ground in a jarring fashion, remains open until jarred again, and closes automatically when dropped on the ground in a jarring fashion. Thus, no provision is made for a grapple-operating tag line.

FIG. 4 also illustrates another feature applicable to all of the other embodiments disclosed herein. This feature is a mobile tail spar assembly 88 to which the tail block 90 is mounted. A mobile tail spar may be employed with fixed head spar, in which case only the tail spar position is shifted to cover an area from one head spar location, or the tail spar may be employed with a mobile tower yarder as shown in FIG. 4 so that the position of one or the other, or both positions, may be shifted as desired to cover the area.

Figure 5:
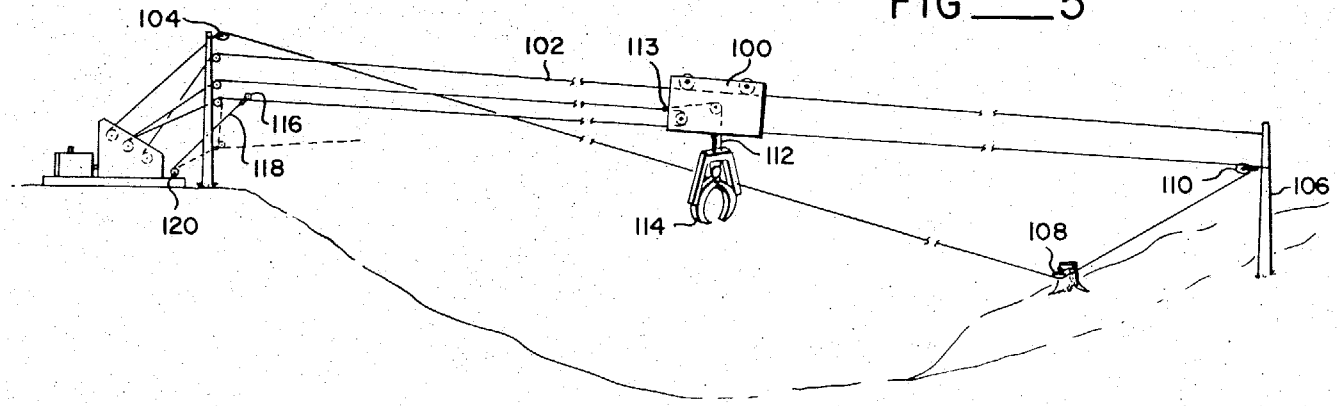
FIG. 5 is a pictorial representation of an other embodimen of this invention wherein a carriage-mounting skyline and a two-line, tag-line operated grapple are employed.

FIG. 5 illustrates still another grapple yarding system employing a carriage-mounted two line grapple. In this system, the carriage 100 is supported by and rides on a skyline 102 that is rigged through a head spar 104 to a tail spar 106. A haulback line is shown rigged from the head spar, through a corner block 108 and a tail block 110 to the tail end of the carriage. A two-part mainline, wound on two common shaft-mounted mainline drums that are rotated together, extends around a sheave on the head end of the carriage. A tag line 112 is attached at 113 to one part of the mainline and to the grapple 114 to control the latter.

As in the FIG. 1 embodiment, relative movement of the connector point 113 toward or away from the carriage either opens or closes the grapple, depending upon the grapple design. This relative movement is accomplished by a line shortener comprising a sheave 116 that rides on one part of the mainline and that is adapted to be drawn downward by a cable 118 wound on a drum 120 as shown by dotted lines. Drawing the sheave-mounting part of the mainline down to the dotted line position will effect the shifting of point 113 toward the carriage as both parts of the mainline simultaneously unwind from the mainline drum.

The skyline feature of the FIG. 5 embodiment could be applied to the other disclosed embodiments if desired.

Figure 6:
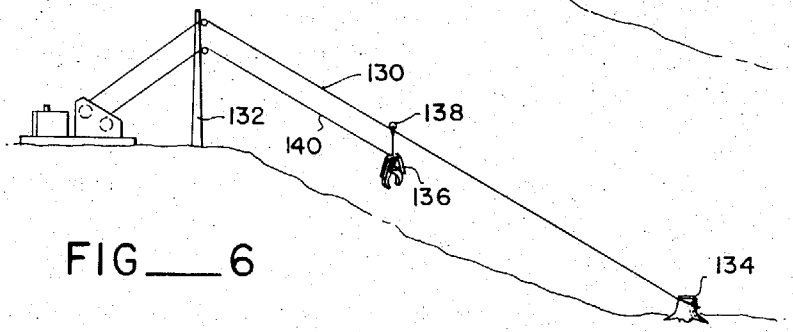
FIG. 6 is a pictorial representation of another embodiment of this invention wherein a skyline-mounted single line grapple is employed for uphill yarding.

The FIG. 6 embodiment is suitable for uphill yarding and comprises a skyline 130 strung from its cable-winding drum through the head spar 132 and anchored to a tail stump or spar 134. A single line grapple 136, of the type described above with reference to FIG. 4, is suspended from a block type carriage 138 that rides on the skyline 130. An inhaul line 140 extends from its respective cable-winding drum through the head spar to the grapple 136 whereat it is anchored similarly to the FIG. 4 embodiment. In this relatively simple system, the weight of the grapple will cause the grapple to travel down the skyline toward the tail stump when the line 140 is slackened off. The skyline is slackened to lower the grapple and tightened to raise the grapple. The grapple loaded with a turn of logs is hauled in to the landing by winding in the inhaul line 140. In practice, the mainline of a yarder could be employed as skyline 130 and the haulback line could be employed as the inhaul line 140.

It is believed that the invention will have been clearly understood from the foreging detailed description of our now-preferred illustrated embodiment. Changes in the details of construction may be restored to without departing from the spirit of the invention and it is accordingly our intention that no limitations be implied and that the hereto annexed claims to be given the broadest interpretation to which the employed language fairly admits.

The embodiments of the invention in which an exclusive property or privilege is claimed are defined as follows:

[1. A method of yarding logs which comprises the steps of providing a yarder equipped with a yarding cable system including inhaul and outhaul lines; providing a suspension carriage assembly suspended by and movable along a cable of said suspension yarding system; providing a grapple fixedly secured to and suspended by said suspension carriage assembly; rigging the outhaul line from said yarder through an outlying haulback block to said suspension carriage assembly; drawing said carriage suspension assembly out along its suspending cable by inhauling on the outhaul line; lowering said carriage suspension assembly by slackening its suspending cable to bring said grapple into contact with a turn of logs; causing said grapple to close on the turn of logs; raising said carriage suspension assembly by tightening its suspending cable and drawing said carriage suspension assembly in by inhauling on the inhaul line to bring in the turn of logs with said grapple; and causing said grapple to open to release the turn of logs.]

[2. A method according to claim 1 wherein the inhaul line is a two part line rigged through said suspension carriage assembly; and including a grapple operating tag line connected to one part of the two-part inhaul line and to said grapple; said inhaul line being wound on yarder cable drums in such a manner that the point of connection between the inhaul line and the tag line can be advanced toward and away from said carriage when opening and closing said grapple.]

[3. A method according to claim 1 wherein said yarder is provided with a guylineless yarding tower and wherein the yarding position is shifted such that the grapple can fully traverse the area to be yarded.]

4. A method according to claim [1] *18* wherein said suspension line comprises said outhaul line with said suspension carriage assembly running on said outhaul line between said yarder and said outlying haulback block.

[5. A method of yarding logs which comprises the steps of providing a yarder equipped with inhaul and outhaul lines; providing a suspension carriage assembly; providing a grapple suspended by said suspension carriage assembly; rigging the outhaul line from said yarder through an outlying haulback block to said suspension carriage assembly and rigging the inhaul line from said yarder to said suspension carriage assembly, the suspension carriage assembly being suspended by the outhaul line to travel back and forth thereon in response to the inhauling of the inhaul and outhaul lines; drawing said carriage suspension assembly out by inhauling on the outhaul line; lowering said grapple to pick up a turn of logs with said grapple; causing said grapple to close on the turn of logs; drawing said suspension carriage assembly in by inhauling on the inhaul line to bring in the turn of logs with said grapple; and causing said grapple to open to release the turn of logs.]

6. A method according to claim [5] *26* [wherein said grapple is fixedly secured to said carriage, and] wherein said grapple is lowered to pick up a turn of logs and raised for bringing in a turn of logs by slackening and tightening the outhaul line.

[7. A system for yarding logs which comprises a grapple; suspension carriage means fixedly securing and suspending said grapple; an outlying outhaul line block; yarder means including inhaul and outhaul line drums and inhaul and outhaul line cables wound thereon, the outhaul line being rigged through said outhaul line block to said suspension carriage means and the inhaul line being rigged to said suspension carriage means in a manner such that said yarder means is adapted to lower said suspension carriage means to bring said grapple into a log-engaging position and to raise said suspension carriage means for bringing in a turn of logs.]

[8. The system of claim 7 including a grapple-operating tag line cable connected to said grapple; and powered means self-contained within and carried by said suspension carriage means to extend and retract the tag line.]

[9. A system for yarding logs which comprises suspension carriage means; a grapple secured to and suspended from said suspension carriage means; an outlying outhaul line drums and inhaul and outhaul line cables wound thereon, the outhaul line being rigged through said outhaul line block to said suspension carriage means with said suspension carriage means riding on and being suspended by said outhaul line, and the inhaul line being rigged to said suspension carriage means; said yarder means being adapted to lower said suspension carriage means to bring said grapple into lock engaging position by slackening said outhaul line and adapted to raise said suspension carriage means for bringing in a turn of logs by tightening said outhaul line.]

[10. The system of claim 9 wherein said inhaul line comprises a two-part line rigged to said suspension carriage means and including a grapple-operating tag line cable connected to one part of the two part inhaul line and to said grapple; and wherein said yarder means includes two inhaul line drums adapted to wind the two parts of said two-part inhaul line in such a manner that the point of connection between the inhaul line and the tag line can be advanced toward and away from said suspension carriage means when opening and closing said grapple.]

11. The system of claim [9] *28* wherein said yarder means is a mobile [, guylineless] tower yarder with said cable-winding drums and a tower member rotatably mounted on a drive vehicle.

12. A system of yarding logs which comprises an outlying tail hold; a suspension carriage means; grapple log engaging means secured to and suspended by said suspension carriage means and adapted to be attached to a turn of logs; yarder means provided with a cable winding drum with one end of a suspending line wound thereon and two cable winding drums with opposite ends of a two part inhaul line wound thereon, the suspending *line* being rigged to said tail hold with said suspension carriage means being suspended by and movable along said suspension line, and the inhaul line being rigged through said suspension carriage means to the two inhaul cable winding drums; and a tag line rigged through said suspension carriage means and connected to one part of said inhaul line and to said log engaging means to control said log engaging means; the inhaul line drums being adapted to wind in one part of said inhaul line and pay out the other part such that the point of connection between the inhaul line and the tag line can be advanced toward and away from said suspension carriage means, and the inhaul line drums being adapted to wind in both parts of said inhaul line to draw in said suspension carriage means.

13. The system of claim 12 wherein said yarding means is a mobile, guylineless tower yarder with said cable-winding drums and a tower member rotatably mounted on a drive vehicle.

14. The system of claim 12 wherein the two cable-winding inhaul line drums are driven through common gearing; and wherein the two drums are provided with independently-operable braking means such that one part of said inhaul line can be wound on to an unbraked drum and the other part paid from a braked drum; and wherein the two drums are interlocked such that both parts of said inhaul line can be drawn in together.

[15. A method of yarding logs uphill which comprises the steps of providing a yarder equipped with an inhaul line and a skyline; rigging the skyline from said yarder to a downhill connector; providing a grapple and a suspension carriage assembly suspended by and movable along said skyline; providing a grapple fixedly secured to and suspended by said suspension carriage assembly; rigging the inhaul line from said yarder to said suspension carriage assembly; drawing said carriage suspension assembly out and downhill by slackening off on said inhaul line; lowering said suspension carriage assembly by slackening said skyline to bring said grapple into contact with a turn of logs; causing said grapple to close on the turn of logs; raising said suspension carriage assembly by tightening said skyline and drawing said suspension carriage assembly in by inhauling on the inhaul line to bring in the turn of logs with said grapple; and causing said grapple to open to release the turn of logs.]

16. A method according to claim [15] *29* wherein the inhaul line is a two-part line rigged through said suspension carriage assembly; and including a grapple operating tag line connected to one part of the two-part inhaul line and to said grapple; said inhaul line being wound on yarder cable drums in such a manner that the point of connection between the inhaul line and the tag line can be advanced toward and away from said carriage when opening and closing said grapple.

17. A method according to claim [15] *29* wherein said yarder is provided with a guylineless yarding tower and wherein the yarding position is shifted such that the grapple can fully traverse the area to be yarded.

*18. A method of yarding logs which comprises the steps of providing a yarder equipped with a yarding cable system including inhaul and outhaul lines; providing a suspension carriage assembly suspended by and movable along a cable of said yarding cable system; providing a grapple fixedly secured to and suspended by said suspension carriage assembly; said grapple having an operating line for opening and closing the grapple in response to selectively tensioning or slackening of at least one of the lines of the yarding cable system; rigging the outhaul line from said yarder through an outlying haulback block to said suspension carriage assembly; drawing said carriage suspension assembly out along its suspending cable by inhauling on the outhaul line; lowering said carriage suspension assembly by slackening its suspending cable to bring said grapple into contact with a turn of logs; actuating the operating line to cause the grapple to close on the trun of logs; raising said carriage suspension assembly by tightening its suspending cable and drawing said carriage suspension assembly in by inhauling on the inhaul line to bring in the turn of logs with the grapple; and actuating the operating line to cause the grapple to open and release the turn of logs.*

*19. A system for yarding logs which includes a yarder, a cable-suspended carriage equipped with a log grapple fixedly attached thereto and having jaws for opening and closing on logs to be yarded in response to a grapple operating tag line, said apparatus comprising:*

*a cable extending from the yarder, looped around a sheave in the carriage and extending back to the yarder;*

*drum means at the yarder for winding said cable;*

*a grapple operating tag line connected to said cable loop adjacent the carriage and operative for controlling the grapple jaws in response to predetermined movement of the connection point relative to said carriage; and*

*means including said drum means and operable for selectively moving the carriage independently of movement of said connection point relative to said carriage, and for selectively imparting said predetermined movement of the connection point relative to said carriage to control said grapple jaws.*

*20. A system in accordance with claim 19 wherein said drum means includes means for independently inhauling or outhauling the individual cable ends at said yarder to hold said connection point in either a fixed or a moved position relative to said carriage means.*

*21. A system in accordance with claim 19 wherein said selectively operable means includes:*

*an outhaul line extending from said yarder, around an outlying haulback block and back to said carriage for engagement therewith, the positioning of said carriage being caused by selective tensioning or slackening of said cable and said outhaul line.*

*22. A system in accordance with claim 21 wherein said carriage is suspended by and movable on said outhaul line.*

*23. A method for yarding logs which includes a yarder, a cable-suspended carriage equipped with a log grapple having jaws for opening and closing on logs to be yarded in response to a grapple operating tag line, said method comprising the steps of:*

*extending a cable from the yarder, looping the cable around a sheave in a carriage, and extending the cable back to the yarder;*

*independently winding either or both of the cable ends at the yarder;*

*connecting a cable operating tag line at a point on the cable loop adjacent the carriage;*

*selectively moving the carriage independently of movement of said connection point relative to said carriage; and*

*selectively imparting a predetermined movement of the connection point relative to said carriage to control the grapple jaws.*

*24. A method of yarding logs which comprises the steps of providing a yarder equipped with a yarding cable system including a two part inhaul line and an outhaul line; providing a suspension carriage assembly suspended by and movable along a cable of said yarding cable system, the two part inhaul line being rigged through the suspension carriage assembly, providing a grapple fixedly secured to and suspended by said suspension carriage assembly, the grapple including an operating tag line connected to one part of the two part inhaul line, the inhaul line being wound on yarder cable drums in such a manner that the point of connection between the inhaul line and the tag line is advanced toward or away from the carriage to open and close the grapple; rigging the outhaul line from said yarder through an outlying haulback block to said suspension carriage assembly; drawing said carriage suspension assembly out along its suspending cable by inhauling on the outhaul line; lowering said carriage suspension assembly by slackening its suspending cable to bring said grapple into contact with a turn of*

*logs; causing said grapple to close on the turn of logs; raising said cable and drawing said carriage suspension assembly in by inhauling on the inhaul line to bring in the turn of logs with said grapple; and causing said grapple to open to release the trun of logs.*

*25. The method according to claim 18 wherein the grapple operating line comprises a tag line and selectively extending and retracting the tag line relative to the grapple to open or close the grapple.*

*26. A method of yarding logs which comprises the steps of providing a yarder equipped with inhaul and outhaul lines; providing a suspension carriage assembly; providing a grapple suspended by said suspension carriage assembly; said grapple having an operating line for opening and closing the grapple in response to selectively tensioning or slackening of at least one of the lines of the yarding cable system; rigging the outhaul line from said yarder through an outlying haulback block to said suspension carriage assembly and rigging the inhaul line from said yarder to said suspension carriage assembly, the suspension carriage assembly being suspended by the outhaul line to travel back and forth thereon in reponse to the inhauling of the inhaul and outhaul lines; drawing said carriage suspension assembly out by inhauling on the outhaul line; lowering said grapple to pick up a turn of logs with said grapple; actuating the operating line to cause the grapple to close on the turn of logs; drawing said suspension carriage assembly in by inhauling on the inhaul line to bring in the turn of logs with said grapple; and actuating the operating line to cause said grapple to open and release the turn of logs.*

*27. A system for yarding logs which comprises a grapple; suspension carriage means fixedly securing and suspending said grapple; an outlying outhaul line block; yarder means including inhaul and outhaul line drums and inhaul and outhaul line cables wound thereon, the outhaul line being rigged through said outhaul line block to said suspension carriage means and the inhaul line being rigged to said suspension carriage means in a manner such that said yarder means is adapted to lower said suspension carriage means to bring said grapple into a log-engaging position and to raise said suspension carriage means for bringing in a turn of logs; the grapple having an operating line for opening and closing the grapple in response to selectively tensioning or slackening of at least one of the inhaul and outhaul lines.*

*28. A system for yarding logs which comprises suspension carriage means; a grapple secured to and suspended from said suspension carriage means; an outlying outhaul line block; yarder means including inhaul and outhaul line drums and inhaul and outhaul line cables wound thereon, the outhaul line being rigged through said outhaul line block to said suspension carriage means with said suspension carriage means riding on and being suspended by said outhaul line, and the inhaul line being a two part line rigged to said suspension carriage means;*

*a grapple operating tag line cable connected to one part of the two part inhaul line and to said grapple, said yarder means being adapted to inhaul the two parts of said two part inhaul line in such a manner that the point of connection between the inhaul line and the tag line is advanced toward and away from said carriage suspension means to open and close said grapple, said yarder means being further adapted to lower said suspension carriage means to bring said grapple into log engaging position by slackening said outhaul line and adapted to raise said suspension carriage means for bringing in a turn of logs by tightening said outhaul line.*

*29. A method of yarding logs which comprises the steps of providing a yarder equipped with an inhaul line, an outhaul line and a skyline; rigging the skyline from said yarder to a remote position; providing a grapple and a suspension carriage assembly suspended by and movable along said skyline; providing a grapple fixedly secured to and suspended by said suspension carriage assembly; the grapple having an operating line for opening and closing the grapple in response to selectively tensioning or slackening of at least one of said yarder lines; rigging the inhaul and outhaul lines from said yarder to said suspension carriage assembly; drawing said carriage suspension assembly away from the yarder by slackening off on said inhaul line and tensioning the outhaul line; lowering said suspension carriage assembly by slackening said skyline to bring said grapple into contact with a turn of logs; actuating the operating line to cause the grapple to close on the turn of logs; raising said suspension carriage assembly by tightening said skyline and drawing said suspension carriage assembly in by inhauling on the inhaul line to bring in the turn of logs with said grapple; and actuating the operating line to cause said grapple to open to release the turn of logs.*

References Cited

The following references, cited by the Examiner, are of record in the patented file of this patent or the original patent.

UNITED STATES PATENTS

| | | | |
|---|---|---|---|
| 745,253 | 11/1903 | Smith | 212—89 |
| 1,789,472 | 1/1931 | Meany | 212—89 |
| 2,318,218 | 5/1943 | Grabinski | 212—90 |
| 1,411,053 | 3/1922 | Manges | 212—89 |
| 2,588,733 | 3/1952 | Knox | 212—77 |
| 3,043,442 | 7/1962 | Wirkkala | 212—7 |
| 3,083,839 | 4/1963 | McIntyre | 212—71 |
| 3,172,544 | 3/1965 | Johnson et al. | 212—89 |

HARVEY C. HORNSBY, Primary Examiner

U.S. Cl. X.R.

212—89, 90, 96